(12) United States Patent
Kilian

(10) Patent No.: US 6,856,717 B2
(45) Date of Patent: Feb. 15, 2005

(54) PACKAGE WITH A LIGHT EMITTING DEVICE

(75) Inventor: Arnd Kilian, Berlin (DE)

(73) Assignee: Hymite A/S, Lyngby (DK)

( * ) Notice: Subject to any disclaimer, the term of this patent is extended or adjusted under 35 U.S.C. 154(b) by 0 days.

(21) Appl. No.: 10/395,687

(22) Filed: Mar. 24, 2003

(65) Prior Publication Data

US 2004/0190836 A1 Sep. 30, 2004

(51) Int. Cl.$^7$ ................................................. G02B 6/26
(52) U.S. Cl. ............................ 385/15; 385/37; 385/39; 385/47
(58) Field of Search .................... 385/137, 15, 37, 385/47, 48, 49, 88, 92, 93, 94; 139/138, 139, 140

(56) References Cited

U.S. PATENT DOCUMENTS

| | | | |
|---|---|---|---|
| 4,966,430 A | | 10/1990 | Weidel |
| 5,454,055 A | * | 9/1995 | Kragl et al. .................. 385/14 |
| 5,650,640 A | * | 7/1997 | Stafford et al. ............... 257/81 |
| 5,696,862 A | | 12/1997 | Hauer et al. |
| 5,745,625 A | * | 4/1998 | Aikiyo et al. ................. 385/94 |
| 5,814,870 A | | 9/1998 | Spaeth |
| 5,930,430 A | * | 7/1999 | Pan et al. ..................... 385/94 |
| 6,019,523 A | * | 2/2000 | Honmou ...................... 385/94 |
| 6,088,501 A | * | 7/2000 | Delrosso ..................... 385/134 |
| 6,130,448 A | * | 10/2000 | Bauer et al. ................. 257/222 |
| 6,155,724 A | * | 12/2000 | Ichino et al. ................. 385/92 |
| 6,213,650 B1 | * | 4/2001 | Moriyama et al. ............ 385/88 |
| 6,257,772 B1 | * | 7/2001 | Nakanishi et al. ............ 385/89 |
| 6,264,377 B1 | * | 7/2001 | Mitsuda et al. ............... 385/88 |
| 6,318,908 B1 | * | 11/2001 | Nakanishi et al. ............ 385/89 |
| 6,422,766 B1 | * | 7/2002 | Althaus et al. ............... 385/94 |
| 6,435,734 B2 | * | 8/2002 | Okada et al. ................. 385/88 |
| 6,485,197 B1 | * | 11/2002 | Kato ........................... 385/92 |
| 6,550,983 B1 | * | 4/2003 | Gilliland et al. .............. 385/93 |
| 6,611,001 B2 | * | 8/2003 | Cappuzzo et al. ............ 257/81 |
| 6,623,178 B1 | * | 9/2003 | Sakurai et al. ................ 385/92 |
| 6,623,180 B2 | * | 9/2003 | Panicker et al. .............. 385/92 |
| 2003/0113076 A1 | * | 6/2003 | Naka et al. .................... 385/92 |
| 2004/0066570 A1 | * | 4/2004 | Lomas et al. ................ 359/891 |

FOREIGN PATENT DOCUMENTS

| | | |
|---|---|---|
| DE | 4436204 C1 | 3/1996 |
| EP | 0942302 A2 | 9/1999 |
| WO | WO 96/00919 | 1/1996 |
| WO | 01/01497 | 1/2001 |
| WO | WO 01/29904 A1 | 4/2001 |

* cited by examiner

*Primary Examiner*—William H. Mayo, III
(74) *Attorney, Agent, or Firm*—Fish & Richardson P.C.

(57) ABSTRACT

A package includes a cap with a solid-state light emitting device mounted within a recess in the cap. A plate is attached to the cap to define a hermetically sealed region in which the light emitting device is housed, and a base is attached to the plate. The plate and base are transparent to a wavelength of light emitted by the light emitting device. An optical wavelength selective element is disposed between the plate and the base to select the wavelength of light to exit the package through the base.

34 Claims, 5 Drawing Sheets

PACKAGE WITH A LIGHT EMITTING DEVICE

BACKGROUND

The disclosure relates to a package with a light emitting device.

An optical package may include one or more optical, opto-electronic and electronic components. Proper packaging of the components is important to ensure the integrity of the signals and often determines the overall cost of the optical assembly. Furthermore, the output of some light emitting devices, including semiconductor lasers, does not always consist of a beam of very coherent, almost monochromatic radiation. For some applications, a non-monochromatic optical output is acceptable. In other applications, however, it may be desirable to provide an optical output at a single wavelength or within a very narrow band of wavelengths.

SUMMARY

A package houses a light emitting device which includes a wavelength selective element mounted outside a hermetically sealed region in which the light emitting device is encapsulated.

The package may include a cap that has a recess within which the light emitting device is mounted. A plate, which is transparent to a wavelength of light emitted by the light emitting device, is attached to the cap to define a hermetically sealed region in which the light emitting device is housed. A base, which also is transparent to the wavelength of light emitted by the light emitting device, is attached to the plate. An optical wavelength selective element is disposed between the plate and the base to select the wavelength of light to exit the package through the base.

Various implementations may include one or more of the following features. The light emitting device may include an edge-emitting semiconductor device, wherein the recess in the cap includes a sidewall with a reflective coating to redirect light emitted by the light emitting device toward the base.

The wavelength selective element may comprise, for example, an optical filter, a thin film filter, an optical grating or an etalon. The thin film filter may include stacks of alternating high and low refractive index material layers. The filter may be tunable.

The package may include a lens located outside the hermetically sealed region to receive light emitted by the light emitting device and to pass the light toward the wavelength selective element. For example, a collimating lens may be positioned outside the hermetically sealed region to receive light from the light emitting device and to pass the light to the wavelength selective element. The lens may be mounted in a recess in the plate. The wavelength selective element also may be disposed within the recess in the plate.

The wavelength selective element may be positioned with respect to the base whereby, during operation, light that is emitted from the light emitting device and that is not selected by the wavelength selective element is not coupled back into the light emitting device.

The base may include a partially reflecting surface to reflect a portion of the light that is emitted from the light emitting device and that is selected by the wavelength selective element to be coupled back into the light emitting device. The partially reflecting surface may be disposed, for example, on an outer surface of the base or on a surface of the base near the plate. The light emitting device may include a reflective surface that, in conjunction with the partially reflective surface of the base, forms a laser type cavity.

An optical waveguide may be used in conjunction with the package to receive the portion of light that exits the base.

In some implementations, an additional plate with a reflecting surface may be provided to form an area between the base and the additional plate, and wherein, during operation, light that is emitted from the light emitting device and that is selected by the wavelength selective element is reflected back into the light emitting devices after passing through said area. The additional plate may include a surface that faces the base and that reflects all the light incident thereon or that reflects all the light incident thereon except light in a narrow wavelength band. The package with the additional plate may be used to detect the concentration of a light absorbing species, for example a gas, in an area between the base and the additional plate.

In various implementations, one or more of the following advantages may be present. The base can serve as a window through which emitted light exits the package. The filter or other wavelength selective element may be designed to allow light of a particular wavelength (or a narrow band of wavelengths) to exit the package. The reflector and a reflective surface at the rear end of the light emitting device may provide a laser type cavity. Reflecting a portion of the light at the particular wavelength (or narrow band of wavelengths) back into the light emitting device can help stabilize the light emitting device. In some implementations, the package may emit substantially coherent, monochromatic radiation.

The lens may help collimate the light beam from the light emitting device in the package so that the light beam is emitted from the package at a low divergence angle. In the first place, this is advantageous to achieve a narrow wavelength response from the wavelength selective device. Furthermore, that can facilitate the incorporation of the package into a larger optical assembly. For example, the assembly may include an optical waveguide such as an optical fiber. Also, a collimated light beam allows for the addition of other optical components, such as beam splitters and optical isolators, placed in the light path before the light beam enters the optical fiber.

By encapsulating the light emitting device within a hermetically sealed package, the reliability and lifetime of the encapsulated components can be enhanced.

Other features and advantages will be readily apparent from the following detailed description, the accompanying drawings and the claims.

DETAILED DESCRIPTION

Figure 1:
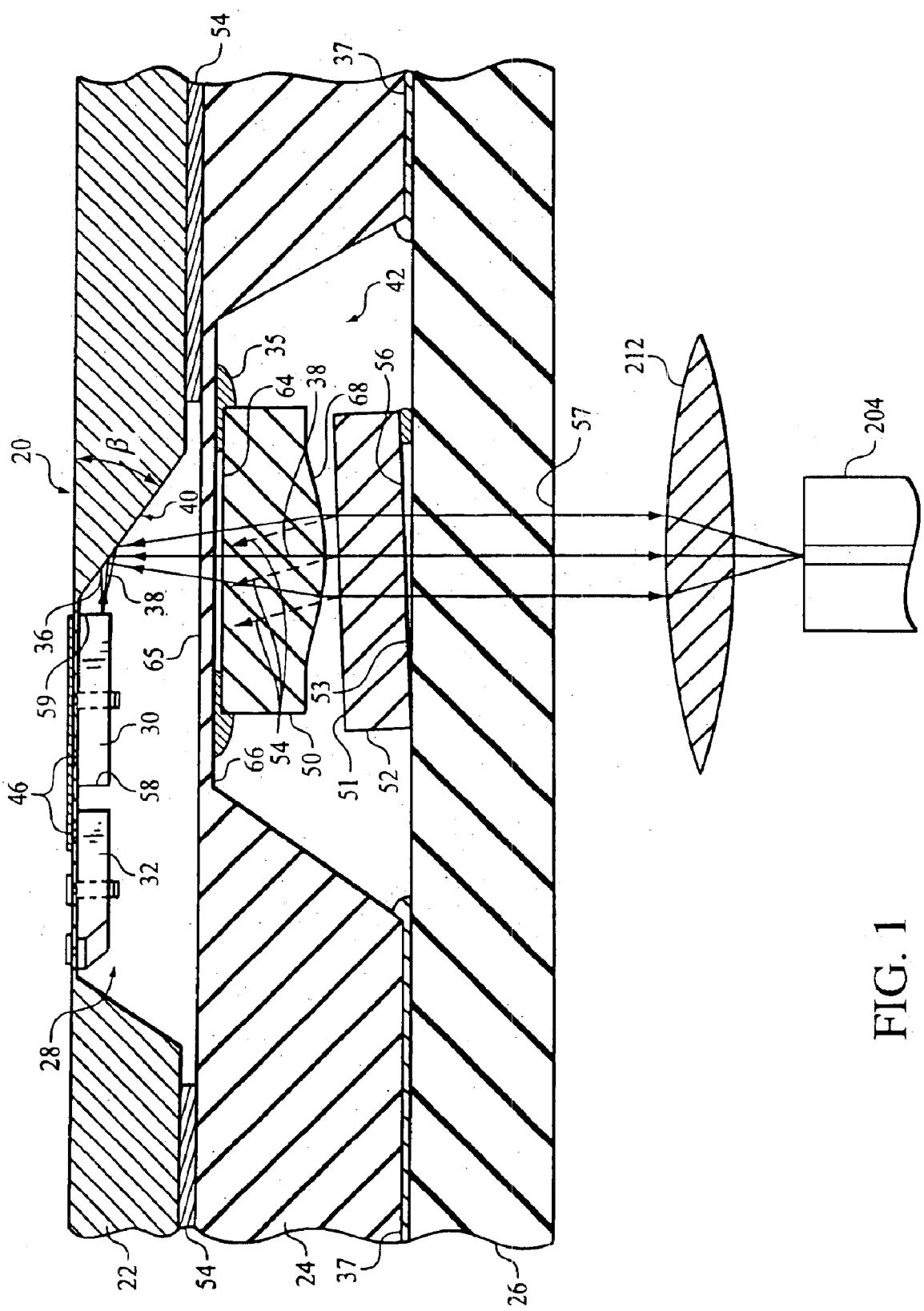
FIG. 1 illustrates a cross-sectional view of an optical package according to one implementation of the invention.

As shown in FIG. 1, an optical package 20 includes a cap 22, a base 26, and a plate 24 positioned between the cap and base. As described in greater detail below, one or more opto-electronic devices, including a solid state light emitting device, may be mounted in a recess 28 on the underside of the cap 22. The plate 24 may be fused to the cap 22 to provide a hermetically sealed micro-housing that encapsulates the opto-electronic device(s) mounted to the underside of the cap. The plate 24 also may include a recess 42 in which a lens 50 is mounted to help collimate the emitted light. Thus, as shown in FIG. 1, the lens 50 may be mounted outside the hermetically sealed housing defined by the cap 22 and the plate 24. Alternatively, the lens be mounted of top of the plate 24 or could be integrated within the plate 24.

As further illustrated in FIG. 1, a wavelength selective element, such as an optical filter or grating 52, is attached to the underside of the base 26 and may be disposed within the recess 42 of the plate 24. In some implementations, the base 26 may be designed to serve as a partial reflector that allows some of the emitted light to pass to the exterior of the package and that reflects some of the light to help stabilize the light emitting device mounted in the cap's recess.

The cap 22 may comprise, for example, a semiconductor material such as silicon, so that the recess 28 can be formed by known etching processes. In the particular implementation of FIG. 1, at least one of the walls 40 of the recess 28 is slanted at an angle β of about 45°.

Figure 2:
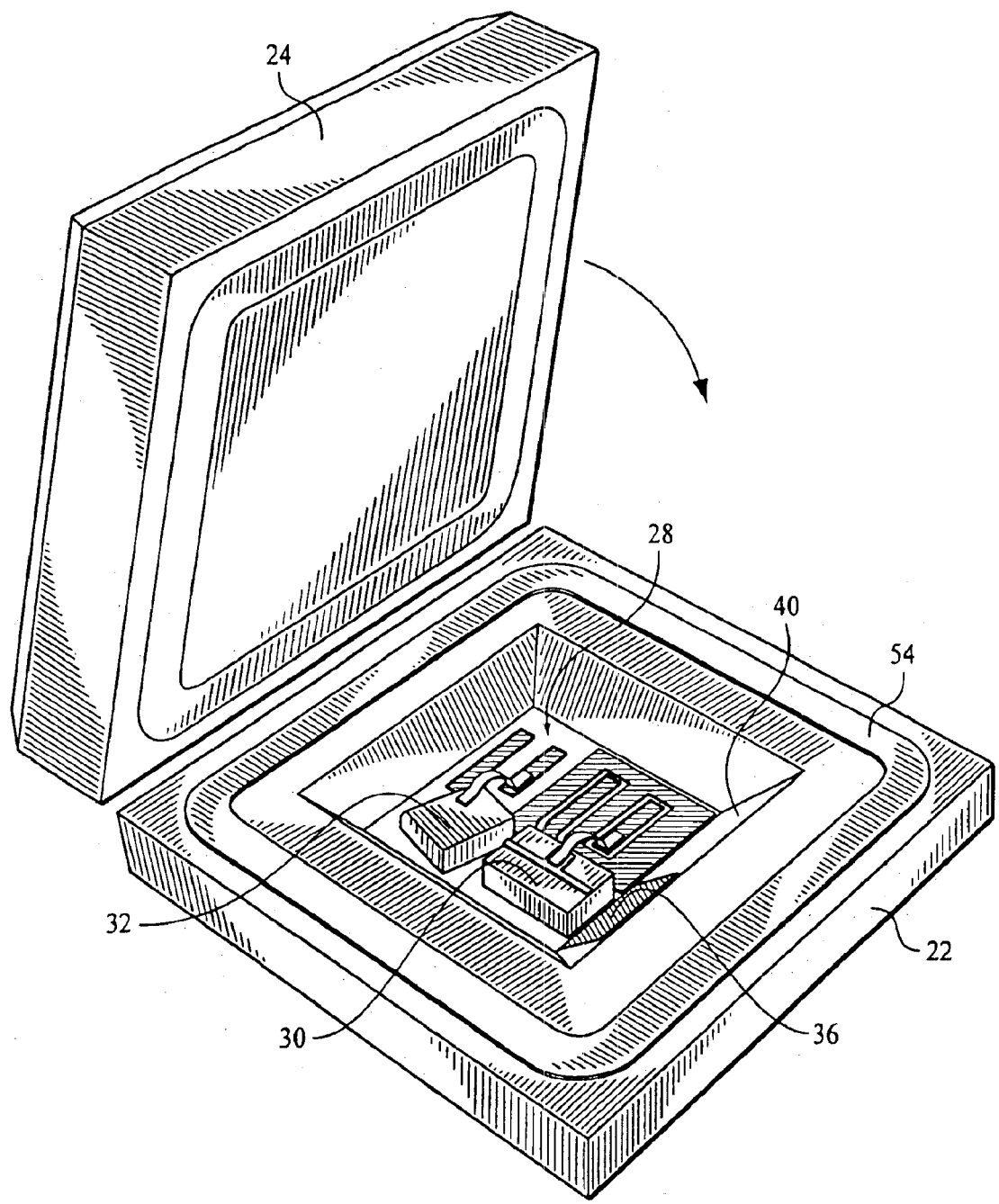
FIGS. 2 through 4 illustrate various details of the package of FIG. 1.

The opto-electronic components may be mounted in the recess 28, for example, by soldering them onto metallic pads previously deposited at the bottom of the recess. As shown in FIGS. 1 and 2, an edge-emitting semiconductor device 30 and a monitor diode 32 are mounted within the recess of the cap 22. In one particular implementation, the device 30 is similar to an edge-emitting semiconductor laser except that its front facet 59 includes an anti-reflection coating to prevent substantial light reflection back into the device's cavity, while its back facet 58 is at least partially reflecting. Alternatively, the front facet can be angled to the light path in the device 30 to prevent reflections back into the device. A high precision pick and place machine, such as an opto-bonder, may be used to position the opto-electronic devices, while fixing them position, e.g., by soldering.

The edge-emitting device 30 may be mounted either with its active side up or down. Mounting the device with its active side down may provide better control of the lateral position of the light emitting region. Furthermore, in high frequency applications, contacts to the device 30 may be made from the front side of the device so as to avoid the use of bond wires. Also, in high power applications, heat flow from the active region may be improved by mounting the device, with its active side down, on a diamond sub-mount or another heat spreader. To prevent partial blocking of the diverging output beam when the light emitting device is mounted with its active side down, a mechanical support to raise the position of the light emitting device within the recess may be added. A thick solder layer or solder bumps may be used, for example, to provide such support.

A portion of the sidewall 40 adjacent the front facet of the device 30 may be coated with a material, such as a metal, which acts as a reflecting surface 36 to redirect the light beam 38 exiting the edge-emitting device toward the lens 50. In the illustrated embodiment, the light beam 38 may be redirected toward the lens 50 at an angle of about ninety degrees (ie., substantially perpendicular) with respect to the exit angle of the light beam from the device 30.

Bond wires or other electrical connections may be provided to connect the light emitting device 30 and monitor diode 32 to metallization contacts. Hermetically sealed feed-through connections 46 may be used to couple the metallization within the recess 28 to electrical contacts on the outside of the package.

Various techniques may be used to form the hermetically sealed through-hole connections 46. One such technique uses a multilayer structure that includes a substantially etch-resistant layer sandwiched between first and second semiconductor layers. The first and second semiconductor layers may include, for example, silicon, and the etch-resistant layer may include, for example, silicon nitride, silicon oxy-nitride or silicon dioxide. The through-holes may be formed using a double-sided etching process in which the first and second layers are etched until the etch-resistant layer is exposed to define the locations of the through-holes. The semiconductor layer that is intended to be on the underside of the cap 22 may be etched over an area that corresponds to the positions of all or a large number of the through-holes. The through-holes then may be formed by removing part of the etch-resistant layer.

The through-holes may be hermetically sealed, for example, using an electroplated feed-through metallization process as the base for the through-hole connections. The feed-through metallization also may include a diffusion barrier, and the sealing material may include, for example, a non-noble metal.

Figure 3:
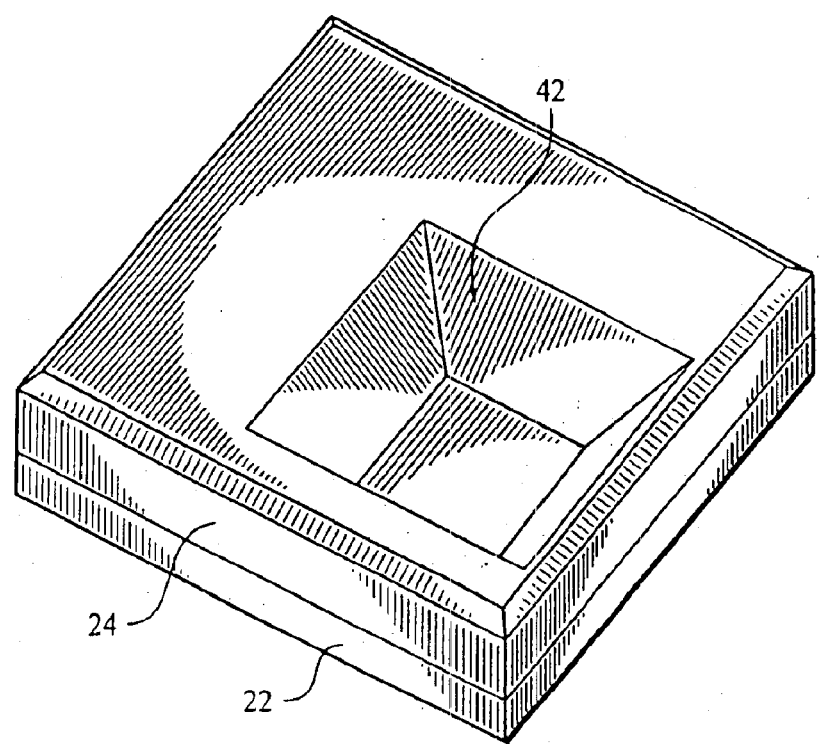
Figure 4:
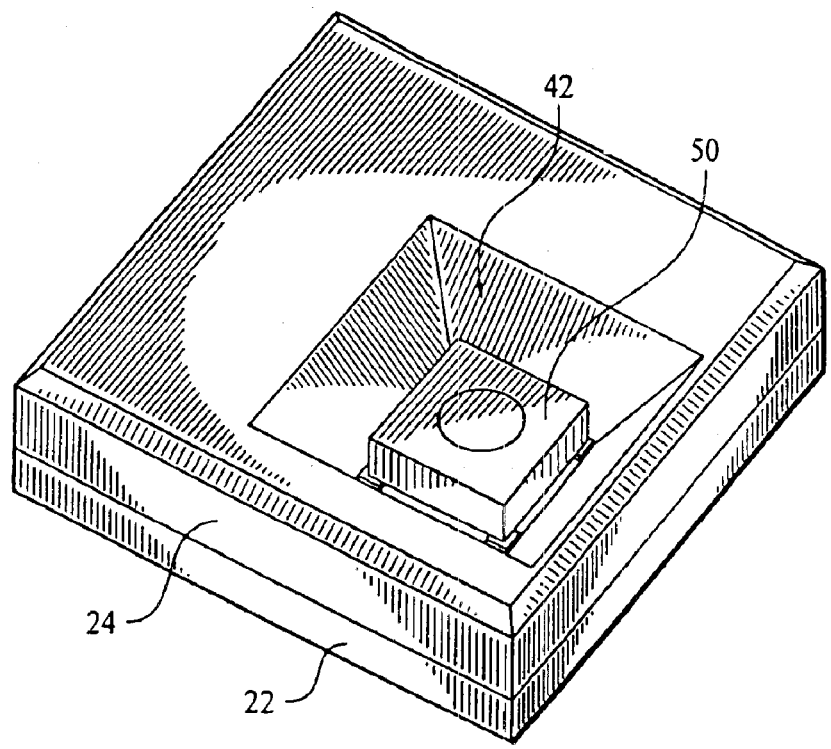

The plate 24 should comprise a material, such as silicon or glass, that is transparent to at least a specified wavelength (or band of wavelengths) of light emitted by the device 30. Preferably, a hermetic seal is formed when the plate is positioned over and fused to the cap 22, for example, using a metal or glass solder ring 54 (see FIG. 2). The lens 50 then may be mounted within a pyramid-shaped recess 42 formed on the reverse side of the lens-holder plate (see FIGS. 3 and 4). In one implementation, the lens 50 may be attached in the recess 42 with adhesive 35 to hold it in place. Mounting the lens 50 within the recess 42 allows the lens to be positioned closer to the light emitting device encapsulated within the hermetically sealed housing defined by the cap 22 and plate 24. During operation, the light beam exits the device 30, is redirected by the reflecting surface 36 and passes through the plate 24. The light may be at least partially collimated by the lens 50 so that the light beam exits the lens at a low divergence angle. Alternatively, if the plate 24 has no recess 42, the lens may be mounted on top of the plate 24 or may be formed as an integral part of the plate 24 assuming its surface is suitably shaped. The front (65) and back (66) side of the plate 24 may be coated to make those surfaces non-reflecting.

The filter or grating 52, which is attached to the base 26 outside the hermetically sealed housing, serves as an external wavelength selective element. The filter 52 may comprise, for example, a thin-film filter that passes a particular wavelength (or narrow band of wavelengths) and that reflects or absorbs the remaining light emitted by the device 30. The filter 52 may be mounted (e.g., with an adhesive or solder 37) at a slight angle with respect to the surface of the base 26 so that light at wavelengths other than the particular wavelength (or outside the narrow wavelength band) is reflected by the filter in a direction indicated by the arrow 54 and is not coupled back into the device 30. In some implementations, the particular wavelength (or narrow wavelength band) that passes through the filter may depend, in part, on the precise angle at which the filter is mounted to the base 26. For implementation that use a grating (e.g., surface grating) as the wavelength selective element 52, it can be designed so that only light of a particular wavelength is diffracted at an angle of 90° angle to the reflector (e.g., surface 56). Light of this particular wavelength then will remain in the cavity formed by the back side 58 of the light emitting device 30 and the reflector (i.e., surface 56) and, therefore, will be amplified by the light emitting device.

The base 26 serves as a window from which the selected wavelength (or band of wavelengths) of light may be emitted to the outside. The base 26, therefore, should comprise a material, such as silicon or glass, that is transparent to the wavelength (or band of wavelengths) selectively passed by the filter 52. The light emitted from the base 26 may be directed, for example, through a lens 212 into an optical fiber 204 (FIG. 1).

Figure 5:
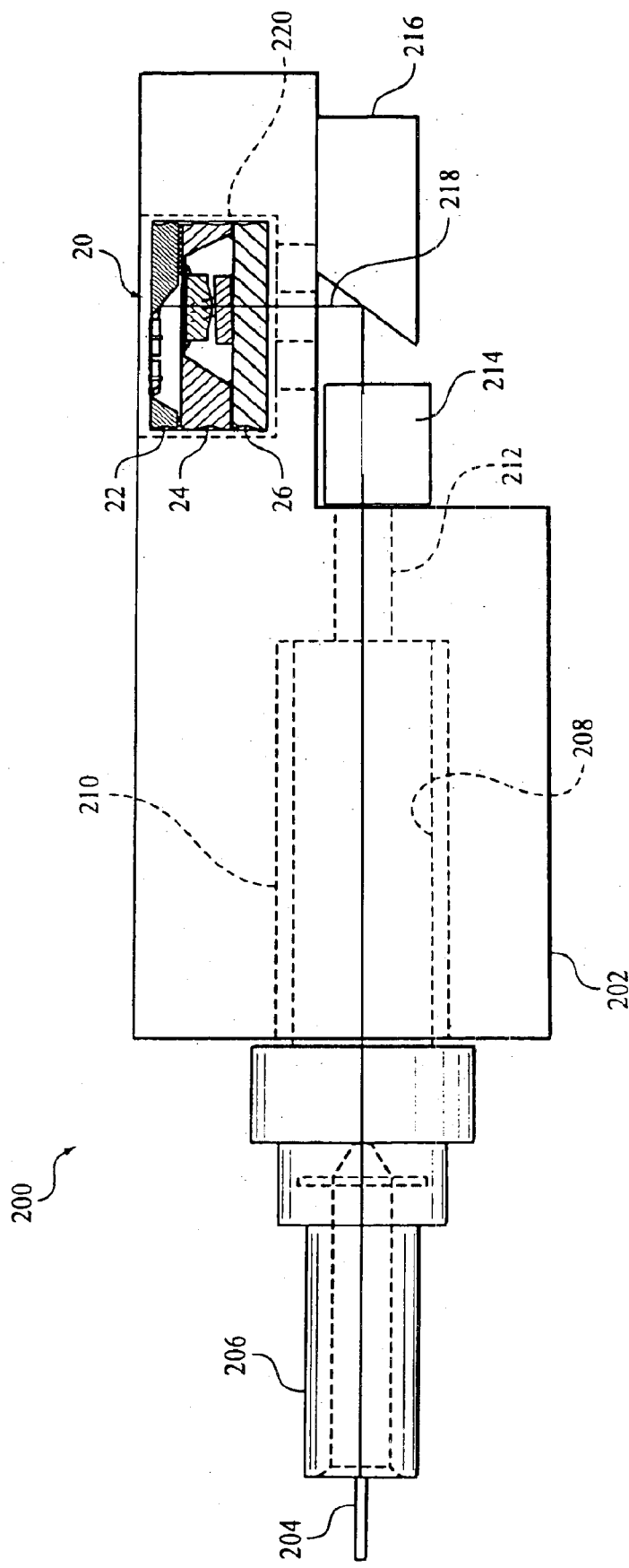
FIG. 5 illustrates an optical assembly incorporating the package of FIG. 1.

In some applications, the base 26 also includes a partial reflector on a surface that intersects the optical path 38. The reflector may be provided, for example, in the form of a coating that includes one or more metal or other layers. Alternatively, if the base 26 were made from silicon, the reflection resulting from its high refractive index may suffice so that no extra coating on the surface would be needed to reflect the light. In this case, the opposing surface of base 26 should be anti-reflection coated. Although FIG. 5 shows the reflector on the inside surface 56 of the base 26, alternatively it may be located on the outer surface 57 of the base. The reflector reflects a predetermined amount of the light back along the optical path 38 so that the light reflected by the reflector is coupled back into the device 30. The external reflector and a reflective surface 58 (e.g., a mirror) at the rear end of the light emitting device provide a laser type cavity. Reflecting a portion of the light at the selected wavelength (or band of wavelengths) from the external reflector back into the device 30 can help stabilize the device. Thus, a first portion of the light at the particular wavelength (or narrow wavelength band) from the device 30 may exit the base 26 as a substantially collimated optical beam while a second portion of the light at the particular wavelength (or wavelength band) is reflected back into the device 30. By appropriate selection of the wavelength selective element 52, the package 20 can emit light at a specified wavelength or within a specified narrow band of wavelengths.

In one particular implementation, the partial reflector may be designed to reflect approximately forty percent of the light back along the optical path 38. In other implementations, the partial reflector may be used to reflect a different amount of light to be coupled back into the light emitting device.

In applications where the device is to be modulated at high speeds, one of the advantages of the package illustrated in FIG. 1 is that a relatively short cavity can be provided between the external reflector (in this case preferentially formed on surface 56) and the reflective surface 58 at the rear end of the light emitting device. A short cavity may facilitate modulation at high speeds. In applications where the device is not modulated (e.g., continuous wave (CW)), a longer cavity length may be desirable, and the reflector can be made on the surface 57.

In some situations, it may be desirable during assembly of the package to confirm the amount of optical back coupling through active alignment of the wavelength selective element 52 and in this way optimize the performance of the device. One way of achieving this is to mount the wavelength selective element 52 onto the base, and then to align and mount the base onto the plate 24 using the material 37 (e.g., an UV-curable adhesive) to adjust the gap.

Several semiconductor light emitting device with different emission bands may be hermetically encapsulated in respective micro-housings as described above. By including a filter with the desired properties in conjunction with a particular one of the encapsulated light emitting devices, any one of several particular optical wavelengths (or narrow wavelength bands)—which together cover a wide range of wavelengths—can be obtained.

In other implementations, a tunable filter may be used as the wavelength selective element 52 to allow the desired wavelength (or wavelength band) of light that exits the package to be changed depending on the application. The tunability may be achieved by any of several techniques. For example, a thin film filter that can be heated to shift its wavelength response may be used. Alternatively, a thin filter that includes a first stack of alternating high and low refractive index material layers on a movable membrane over a second such layer stack on a fixed substrate may be used. Such a thin filter can be provided with an adjustable wavelength response by adjusting the membrane position and, thus, adjusting the distance between the two layer stacks. The wavelength response also may be adjusted by changing the angle of the wavelength selective element mechanically.

The wavelength selective element also may include an etalon. In some implementations, a combination of an etalon and a wavelength selective thin film filter may be advantageous, for example, in an application where the device is meant to be tunable to a set of distinct predetermined wavelengths such as in a wavelength division multiplexed optical network. Here the etalon can be designed to allow the operation only at each of the predetermined wavelengths, while the adjustable thin film filter is used to pick a particular one of the wavelengths.

To enhance performance, anti-reflection coatings may be provided on the surfaces of the plate 24 and lens 50 through which the light passes.

Although the foregoing example refers to an edge-emitting semiconductor device as the opto-electronic device 30 encapsulated within the micro-housing, other light emitting devices may be used as well. If, for example, a surface-emitting device is used, then the reflective surface 40 on the sidewall of the recess 28 may not be necessary because the path of the light beam emitted by the device can be directed toward the lens 50 without the need to redirect the light beam.

The terms "cap" and "base," as used in this disclosure, are not intended to imply a particular orientation of those sections with respect to the top or bottom of the package. In some implementations, the cap may be located above the base, whereas in other implementations, the cap may be located below the base.

The package 20 may be incorporated into any one of a number of optical assemblies. Some assemblies may include, for example, an optical fiber or other waveguide into which light emitted by the semiconductor light emitting device is coupled. Other optical components, including optical beamsplitters and optical isolators, may be positioned in the light path after the light exits the package and before it is coupled into the optical fiber.

FIG. 5 illustrates one example of an assembly 200 that incorporates a package like the one described above. In the particular example of FIG. 5, the assembly includes a housing 202 which has a recess 220 to receive the package 20. The housing may be made, for example, from metal using precision milling and drilling. A connector-receptacle for an optical fiber 204 includes a ceramic ferrule 206 which may be positioned within the housing by a ferrule sleeve 210. A cylindrical lens 212 such as a graded index (GRIN)

lens may be disposed within a step bore in the housing between the fiber end and an optical isolator 214. The optical isolator can be used to prevent light reflected from the optical fiber transmission line and the fiber connector from entering the light emitting device within the package 20. A mirror 216 serves to redirect the path 218 of the light beam from the package 20 to the fiber 204.

Efficient optical coupling between the fiber 204 and the light emitting device in the sealed package 20 may be simplified as a result of the lens in the package and the cylindrical lens 212 in the assembly, both of which serve to collimate the light beam. Active alignment may be achieved by adjusting the position of the mirror 216. The mirror may be fixed in place, for example, with an adhesive. The assembly may be mounted to a circuit board (not shown) by flipping over the assembly so that the integrated package 20 is adjacent the circuit board and so that electrical connections are made between the package and the circuit board, for example, through a metal solder.

Figure 6:
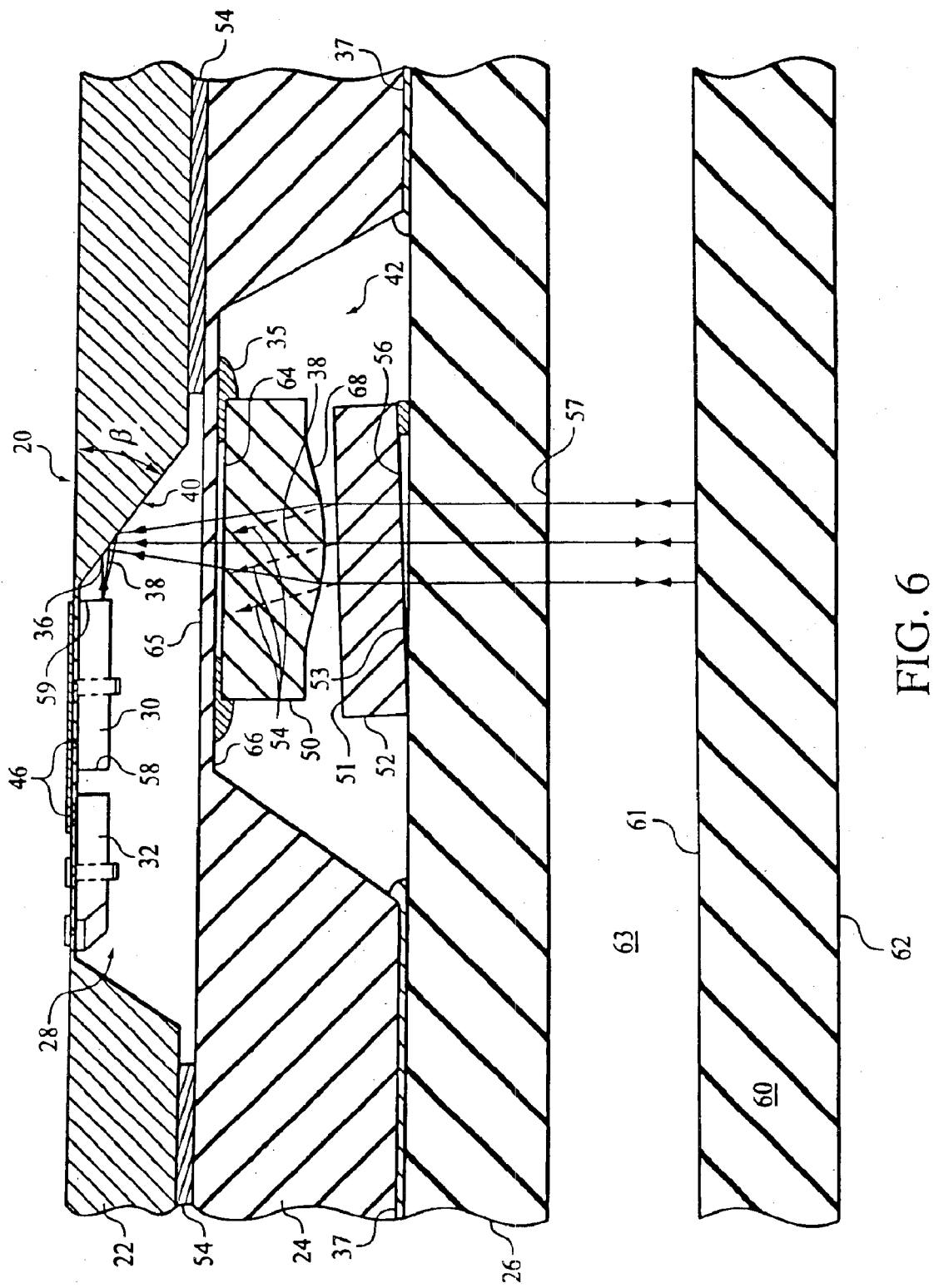
FIG. 6 illustrates another application for the optical package of FIG. 1.

Another application for the package may be in connection with a micro spectrometer employing an inter cavity sensing scheme (see FIG. 6), that could be used, for example, to detect fluids, such as gaseous and liquid species. Instead of the lens 212 and optical fiber 204 (see FIGS. 1 and 5), an additional plate 60 is provided that is mounted at a suitable distance from the base 26. Both surfaces (56, 57) of the base 26 should be anti-reflection coated. Alternatively, the base 26 may be made with a hole in the light path with a seal (e.g., an adhesive) around the outer circumference of the wavelength selector 52. The sensing volume 63 is formed between the base 26 and the outer plate 60, which preferentially has the reflector on its inner surface 61 with a high reflection coefficient. This reflector can either be broad band (e.g., implemented by a metal film), or a thin film with a narrow path band.

The assembly can be used as a detector for a gaseous or liquid species having optical absorption lines in the wavelength band across the device and can be tuned using the tunable wavelength selector 52. The reflector on surface 61 may be a fixed thin film filter passing light at a wavelength in the vicinity of the absorption line(s) of the material(s) to be detected by the assembly, but having a high reflection at all other wavelength.

The device may be operated to scan the wavelength selector constantly over a wavelength band, while the light emitting device is switched on. The power in the cavity formed by the backside 58 of the laser 30 and the reflector on surface 61 is measured with the monitor diode 32. If the material in the sensing area 63 is entirely transparent, the assembly will operate as a laser at every wavelength in the wavelength band except at the pass band of the reflector on surface 61. Therefore, the fixed wavelength can be used for calibration during the scan. If a material with absorption lines in the scanned wavelength region enters the sensing area 63, the type of material can be determined by the position of the absorption band (relative to the fixed wavelength filter on surface 61). The concentration of the species possessing absorption band in relation to other species in the sensing volume can be determined by comparing the measured absorption to the strength of the absorption band and the length of the sensing volume. The device may be very sensitive even to weak absorption lines because of the inner cavity sensing scheme; in other words, the light passes through the sensing volume several times because of the arrangement using two reflectors. At the same time, in this embodiment, the device would be less sensitive to impurities such as dust or other particles in the sensing volume because the measurement would be relative. Thus, the intensity of the light in the cavity would be detected on and next to the absorption band of the species. The detected values may be compared by examining the light intensity at the absorption peak of the substance to be detected, rather than measuring an absolute value.

Other implementations are within the scope of the claims.

What is claimed is:

1. A package comprising:
   a cap including a recess;
   a solid-state light emitting device mounted within the recess;
   a plate attached to the cap to define a sealed region in which the light emitting device is housed, wherein the plate is transparent to a wavelength of light emitted by the light emitting device;
   a base attached to the plate wherein the base is transparent to said wavelength of light, wherein the plate is disposed in an area between the base and the cap such that light emitted by the light emitting device passes through the plate; and
   an optical wavelength selective element, disposed between the plate and the base, to select said wavelength of light to exit the package through the base.

2. The package of claim 1 wherein the light emitting device includes an edge-emitting semiconductor device, and wherein the recess in the cap includes a sidewall with a reflective coating to redirect light emitted by the light emitting device toward the base.

3. The package of claim 1 wherein the wavelength selective element comprises an optical filter.

4. The package of claim 3 wherein the wavelength selective element comprises a thin film filter.

5. The package of claim 4 wherein the thin film filter comprises stacks of alternating high and low refractive index material layers.

6. The package of claim 3 wherein the wavelength selective element comprises a tunable filter.

7. The package of claim 1 wherein the wavelength selective element comprises an optical grating.

8. The package of claim 1 wherein the wavelength selective element comprises an etalon.

9. The package of claim 1 comprising a lens located outside the sealed region to receive light emitted by the light emitting device and to pass the light toward the wavelength selective element.

10. The package of claim 9 wherein the plate includes a recess in which the lens is mounted.

11. The package of claim 9 wherein the wavelength selective element is disposed within the recess in the plate.

12. The package of claim 1 wherein the plate includes a recess in which a lens is mounted.

13. The package of claim 1 wherein the wavelength selective element is positioned with respect to the base whereby, during operation, light that is emitted from the light emitting device and that is not selected by the wavelength selective element is not coupled back into the light emitting device.

14. The package of claim 1 wherein the base includes a partially reflecting surface to reflect a portion of the light that is emitted from the light emitting device and that is selected by the wavelength selective element to be coupled back into the light emitting device.

15. The package of claim 14 wherein the light emitting device includes a reflective surface that, in conjunction with the partially reflective surface of the base, forms a laser type cavity.

16. The package of claim 15 wherein the light emitting device includes an edge-emitting semiconductor device, and wherein the recess in the cap includes a sidewall with a reflective coating to redirect light emitted by the light emitting device toward the wavelength selective element.

17. The package of claim 15 wherein the partially reflecting surface is disposed on an outer surface of the base.

18. The package of claim 15 wherein the partially reflecting surface is disposed on a surface of the base near the plate.

19. The package of claim 1 comprising a collimating lens positioned outside the hermetically sealed region to receive light from the light emitting device and to pass the light to the wavelength selective element.

20. The package of claim 1 wherein an additional plate with a reflecting surface is provided to form an area between the base and the additional plate, and wherein, during operation, light that is emitted from the light emitting device and that is selected by the wavelength selective element is reflected back into the light emitting devices after passing through said area.

21. The package of claim 20 wherein the light emitting device includes a reflective surface that, in conjunction with a partially reflective surface of the base, forms a laser type cavity.

22. The package of claim 21 wherein the light emitting device includes an edge-emitting semiconductor device, and wherein the recess in the cap includes a sidewall with a reflective coating to redirect light emitted by the light emitting device toward the reflective surface on the additional plate.

23. The package of claim 21 wherein the base is anti reflection coated.

24. The package of claim 21 wherein the base has an opening through which light emitted from the light emitting device passes.

25. The package of claim 21 wherein the additional plate includes a surface that faces the base and that reflects all the light incident thereon.

26. The package of claim 21 wherein the additional plate includes a surface that reflects all the light incident thereon except light in a narrow wavelength band.

27. An apparatus comprising a package according to any one of claims 20 through 26 to detect a concentration of a light absorbing species in an area between the base and the additional plate.

28. The package of claim 1 including a reflective surface within the recess to redirect light emitted by the light emitting device toward the base.

29. An apparatus comprising:

a package according to any one of claims 1–19 and 28; and an optical waveguide to receive the portion of light that exits the base.

30. The package of claim 28 including a lens through which light from the light emitting device passes before reaching the wavelength selective element.

31. The package of claim 30 wherein the plate is attached to the cap to define a hermetically sealed region in which the light emitting device is housed.

32. The package of claim 1 wherein the light emitting device is housed within a hermetically sealed area.

33. The package of claim 1 wherein the plate is attached to the cap to define a hermetically sealed region in which the light emitting device is housed.

34. The package of claim 1 including a lens through which light from the light emitting device passes before reaching the wavelength selective element.

* * * * *